United States Patent Office 3,524,835
Patented Aug. 18, 1970

3,524,835
HEAT TREATMENT OF POLY(ARYLENE SULFIDE) RESINS
James T. Edmonds, Jr., and Harold Wayne Hill, Jr., Bartlesville, Okla., assignors to Phillips Petroleum Company, a corporation of Delaware
No Drawing. Original application Nov. 27, 1963, Ser. No. 327,143, now Patent No. 3,354,129, dated Nov. 21, 1967. Divided and this application Sept. 11, 1967, Ser. No. 666,999
Int. Cl. C08g 23/00
U.S. Cl. 260—79.1     11 Claims

ABSTRACT OF THE DISCLOSURE

Poly(arylene sulfide) resins are increased in molecular weight by heat treatment under oxidizing atmosphere at an elevated temperature above the melting point of said polymer to produce thermoplastic materials capable of withstanding very high temperatures.

---

This is a divisional application of Ser. No. 327,143, filed Nov. 27, 1963, Pat. No. 3,354,129.

This invention relates to the production of polymers from aromatic compounds. In one of its aspects the invention relates to the formation of arylene sulfide polymers by the reaction of at least one polyhalo-substituted cyclic compound with an alkali metal sulfide in a reaction medium comprising a polar organic compound. In another of its aspects the invention relates to the formation of a high molecular weight polymer which comprises reacting at least one polyhalo-substituted compound with an alkali metal sulfide which has been at least partially dehydrated or dried, the reaction being effected in solution in a polar organic compound which is a solvent for the reactants and which is stable at the reaction conditions which include an elevated temperature. In a still further aspect of the invention alkali metal sulfide and polyhalo-substituted aromatic compounds are caused to interact forming polymers in a polar organic compound solvent at elevated temperature following which the polymer thus produced is heat treated in the absence of oxygen or as may be desired with an oxidizing agent to increase the molecular weight and improve properties such as tensile strength. In a still further aspect of the invention a minor amount of a monohalo-substituted aromatic compound is present during at least part of the polymer forming reaction and is effective as a chain-terminating reactant providing a control upon the molecular weight of the polymer as formed. In still a further aspect of the invention there is present during at least a part of the polymer forming reaction a small amount of copper or a copper compound to aid in the formation of polymer. In a further aspect still the invention relates to the formation of arylene sulfide polymers by a reaction in a polar organic compound which is a solvent for the reactants comprising an alkali metal sulfide and at least one polyhalo-substituted cyclic compound, there being present during at least a part of the polymer forming reaction a polyhalo-substituted aromatic compound which contains substituents through which cross-linking can be effected by further reaction.

In recent years, a wide variety of high polymers have been prepared, many of which are currently being produced and marketed on a large scale. While such polymers are useful in many areas, one property of high polymers, particularly those of the thermoplastic type, which needs to be improved is the ability to withstand high temperatures. Since thermoplastic material can be molded rapidly and efficiently into almost any desired shape, they lend themselves to mass production. A high polymer, especially a thermoplastic material, which could stand very high temperatures, and thus could be used in such areas as missiles, high temperature insulation, and the like, has been the objective of a great deal of research.

It is an object of this invention to produce a polymer. It is another object of this invention to produce a polymer having high temperature resistance properties. It is still another object of this invention to provide a method for producing a polymer. It is a further object to provide a method employing a specified type of solvent for the preparation of said polymer. It is a further object of this invention to prepare sulfur containing polymers. It is a further object of this invention to prepare polymers which can be further treated to increase molecular weight. It is still another object of this invention to prepare polymers which can be cross linked, for example, by use of a dicarboxylic acid to form polyamide-type cross links. In a further object still the invention provides polymers which can be molded, spun, used in high temperature conditions, can be used to impregnate materials such as fiber glass, cloth, etc.

Other aspects, objects, and several advantages of this invention are apparent from a stud of this disclosure and the appended claims.

According to the present invention arylene sulfide polymers can be prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperature. Generally the polar organic compound will substantially dissolve both the alkali metal sulfide and the polyhalo-substituted aromatic compound, or other compound which may be present as will appear hereinafter.

The polyhalo-substituted compounds which can be employed as primary reactants in the process of this invention are represented by the formulas:

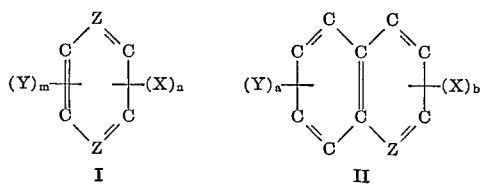

I   II

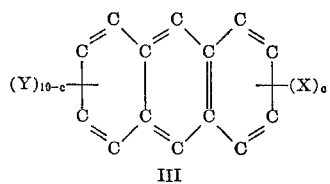

III

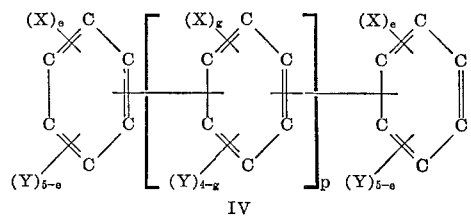

IV

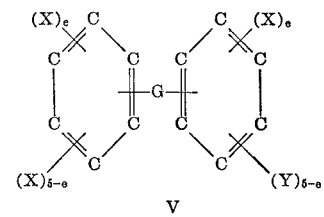

V

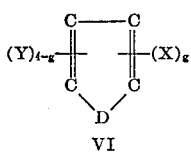

VI wherein each X is a halogen selected from the group consisting of chlorine, bromine, iodine, and fluorine, preferably chlorine and bromine, each Y is selected from the group, consisting of hydrogen, —R, —N(R)$_2$,

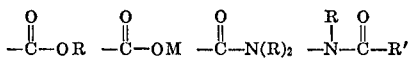

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of:

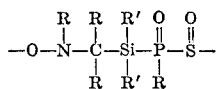

and

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of this invention are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mole of Na$_2$S, or it can be obtained containing about 60–62 weight percent Na$_2$S and about 38–40 weight percent water of hydration.

The polar organic compounds which are employed as reaction media in the process of this invention should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfilane, dimethylacetamide, low molecular weight polyamides and the like.

Some specific examples of polyhalo-substituted compounds of the above general formulas which can be employed in the process of this invention are:

1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene
1-cyclohexyl-2,5-diiodobenzene
1-isooctyl-2,4-difluorobenzene
1-n-dodecyl-2,5-dichlorobenzene
1-benzyl-2,5-dibromobenzene
1,4-di-n-butyl-2,5-dichlorobenzene
1,4-di-n-nonyl-2,6-di-bromobenzene
1,3,5-trichloro-2,4,6-triphenylbenzene
1,4-dibromo-2,3,5,6-tetra(4-ethylphenyl)benzene
methyl 2,5-dichlorobenzoate
isopropyl 2,3,5-tribromobenzoate
cyclohexyl 2,4,6-triiodobenzoate
phenyl 2,3,4,5,6-pentachlorobenzoate
2,5-dichlorobenzamide
N,N-di-n-dodecyl-2,4,5-tribromobenzamide
ethyl 2,4,5-trichloroacetanilide
cyclohexyl N-methyl-2,5-dibromoacetanilide
1,4-dibromonaphthalene
1,4-dichloro-7,8-diethylnaphthalene
1-methoxy-2,5-dichlorobenene
1-cyclohexylthio-2,5-dichlorobenzene
1,4,7,8-tetrabromo-2,3,5,6-tetra-n-butylnaphthalene
1,3,5-trichloro-7-aminonaphthalene
n-octyl 2,4-dibromo-naphthalene-1-carboxylate
N,N-dimethyl-5,6,7,8-tetrabromo-1-naphthalenecarboxamide
1-acetamido-2,4-dibromonaphthalene
8-decoxy-1,4-difluoronaphthalene
6,7-dibenzyl-8-methylthio-1,4-dichloronaphthalene
1,4-dichloroanthracene
1,7-dibromo-6-cyclohexylanthracene
2,8-diiodo-3,7-diethylanthracene
1-dodecyl-2,6-difluoroanthracene
1,2,4-trichloro-6-carbethoxyanthracene
2,6-dibromo-8-aminoanthracene
3,7-diiodo-4-cyclohexylthioanthracene
n-decyl-3,8-difluoroanthracene carboxylate
1-acetamido-2,4-dibromoanthracene
10-dodecoxy-1,3,5-trichloroanthracene
4,4'-dichlorobiphenyl
3,4'-dibromo-2-aminobiphenyl
2,2',4-tribromo-6-acetamidobiphenyl
3,3'-dichloro-4,4'-didodecylbiphenyl
4,4'-diiodo-3-ethoxy-6-n-octylbiphenyl
2,2',4,4'-tetrabromo-6-N,N-dimethylaminobiphenyl
4,4'-dichloro-3,3'-dicyclohexylbiphenyl
4,4''-dibromo-p-terphenyl
3,3',3''-trichloro-p-terphenyl
4,4''-dichloro-3'-acetamido-p-terphenyl
4,4''-difluoro-2,2',2''-tri-n-decyl-3'-methoxy-p-terpheny'
4,4''-dibromo-3'-carbbutoxy-p-terphenyl
4,4''-dichloro-2-(N-acetylamino)-p-terphenyl
3,4-dibromothiophene
3,4-dichlorofuran
3,4-difluoropyrrole
2,5-dibromo-4-aminothiophene
2,5-dichloro-3-ethoxythiophene
3,4-difluoro-5-acetamidofuran
3,4-dibromo-5-carbethoxypyrrole
2,5-dichloropyridine
3,5-dibromo-4-methylpyridine 4,8-diiodoquinoline
2,3,6,7-tetrachloro-4,5-di-n-butylquinoline
1,4-dibromo-2,3,5,6-tetrafluorobenzene
4-chlorobromobenzene
2,5-dichlorobenzenesulfonic acid
sodium 2,5-dibromobenzenesulfonate
2,8-difluoronaphthalenecarboxylic acid
lithium 2,7-diiodoanthracenecarboxylate
p,p'-dichlorodiphenyl ether
o,p'-dibromodiphenylamine
2,4'-difluorodiphenylmethane
3,3'-dichlorodiphenyl dimethylsilane
di(2-methyl-4-bromophenyl) sulfoxide
methyl di(3-ethyl-4-chlorophenyl) phosphite
4-bromophenyl 3-n-butyl-4-chlorophenyl sulfone
2,6-dichloropyrazine The process of this invention is carried out by contacting the above-defined reactants in a polar solvent at a temperature of from about 125 to about 450° C., preferably from 175 to 350° C. The mol ratio of polyhalo-substituted aromatic or heterocyclic compounds to $M_2S$ reactants should be at least 0.9:1 and will generally not exceed 2.0:1. If ratios above this range are employed, the amount of unreacted polyhalo-substituted compound will, of course, be increased, and thus require recycle. Larger excess of either reagent leads to lower molecular weight polymers, and these decreases are accelerated by increase in temperature of reaction or the time of reaction. For example, if a slight excess of alkali metal sulfide is used, the polymer, as formed, will be terminated with M—S— groups, wherein M is an alkali metal. Such a polymer can be acidified to form terminal mercaptan groups, if desired. On the other hand, if an excess of polyhalo-substituted reactant is used, the polymer will be terminated with halogen-substituted aromatic of heterocyclic nuclei. Such a polymer can be treated to convert the halogen groups to other groups such as hydroxyls, if desired. It is within the scope of this invention to form a polymer having these terminal groups, and thereafter couple these polymers to form higher molecular weight polymers.

If desired, one can employ relatively small amounts, generally less than 10 percent by weight of the total reactants charge, of copper or a copper compound to aid in polymer formation. Suitable copper compounds include cuprous and cupric sulfides, halides and the like.

The amount of polar organic solvent present in the reaction zone can vary over a wide range from about 100 to 2500 ml. per mol of alkali metal sulfide.

By proper selection of the polyhalo-substituted aromatic reactants, one can modify the polymers, obtaining polymers of varying crystallinity, of varying degrees of crosslinking, and of varying molecular weight. For example, a highly crystalline, high melting poly(phenylene sulfide) can be prepared by the reaction, according to the process of this invention, of p-dichlorobenzene and sodium sulfide in a polar solvent such as N-methylpyrrolidone. By utilizing a mixture of p-dichlorobenzene and 1,2,4-trichlorobenzene, one can greatly increase the degree of crosslinking of the polymer. On the other hand, when a mixture of p-dichlorobenzene and dichlorotoluene is used, the crystallinity of the polymer is reduced, thus changing the melting point and shear viscosity of the polymers.

As a further important modification of this invention, one can employ polyhalo-substituted aromatic compounds which contain other substituents through which cross linking can be effected by further reaction. For example, reaction of sodium sulfide with a mixture of p-dichlorobenzene and 2,5-dichloroaniline yields a phenylenesulfide polymer containing amino groups on some of the aromatic nuclei, depending on the amount of dichloroaniline employed. Such a polymer can be crosslinked by use of a dicarboxylic acid, thus forming polyamide-type crosslinks.

As a still further important modification of this invention, a minor amount of a monohalo-substituted aromatic compound, e.g., mono-chlorobenzene, etc., can be used as a chain-terminating reactant thus providing a means for limiting the molecular weight of the polymers as formed.

The polymers produced by the process of this invention will vary considerably, depending upon the chosen reactants. Some are high melting thermoplastic materials having excellent high temperature stability, while others can be much lower in molecular weight, including liquids and grease-like materials. The melting point or softening point of these polymers can range all the way from liquids 25° C. to polymers melting above 400° C. These polymers can be heat treated in the absence of oxygen or with an oxidizing agent, either under vacuum or at atmospheric or superatmospheric pressure, to increase the molecular weight by either a lengthening of a molecular chain or by crosslinking or by a combination of both to improve such properties as tensile strength. Such treatment can be effected, for example, by heating the polymer preferably to a temperature above its melting point, in some cases as high as 250 to 600° C. Such heat treatment can be carried out when contacting the polymer with air or under vacuum or under an inert gas such as nitrogen.

The polymers produced by the process of this invention can be molded into a variety of useful articles by molding techniques which are well known in the art. Molding should be carried out above the melting point or softening point but below the decomposition point of the particular polymer being molded. Suitable molding techniques include injection molding, compression molding, vacuum forming, extrusion and the like. The polymers can be molded directly after recovery from the reaction zone in which they are prepared, or such polymers can be subjected to a heat treatment as described above prior to molding. In a further aspect, heat treatment below the softening point can be utilized for molded items.

The polymers of this invention have utility in any use wherein high melting point and/or high temperature stability is desired. These polymers can be blended with fillers, pigments, stabilizers, softeners, extenders and other polymers. Such fillers as graphite, carbon black, titania, glass fibers, metal powders, magnesia, asbestos, clays, wood flour, cotton floc, alpha cellulose, mica and the like can be employed. A more complete list of fillers is disclosed in Modern Plastics Encyclopedia, 41, No. 1a, September 1963, pages 529 to 536. If desired, such fillers can be added to the polymerization reactor. These filled polymers are particularly useful in ultra-high temperature applications such as ablative nose cones.

EXAMPLE I

A run was carried out in which poly(phenylene sulfide) was prepared by the reaction of p-dichlorobenzene with sodium sulfide in N-methylpyrrolidone.

In this run, 60 grams $Na_2S \cdot 9H_2O$ in 100 ml. N-methylpyrrolidone was placed in a glass flask and heated to 160° C. while flushing with nitrogen. This preliminary heating was to remove the water of hydration from the sodium sulfide. To this resulting solution was then added 36.7 grams p-dichlorobenzene, and the resulting mixture was sealed in a glass tube. This mixture was then heated at 231° C. for 44 hours, then at 225° C. for 20 hours and then at 260° C. for 24 hours. A polymer was then recovered from the tube which had a melting point of 275–285° C. and which could be molded at 290° C. to a hard film.

Because of the pressure involved in the reaction, all subsequent runs in which $Na_2S$ and p-dichlorobenzene were reacted were carried out in a stainless steel bomb unless otherwise stated. In each run, the desired amount of $Na_2 \cdot 9H_2O$ in the desired amount of reaction diluent was heated to 190° C. while flushing with nitrogen to remove the water of hydration. The resulting solution was then charged to a stainless steel bomb along with the desired amount of p-dichlorobenzene. The contents of the bomb were then heated to approximately 250° C. for the desired reaction time, after which the bomb was opened, then the polymer was removed, and washed with water and acetone. The polymer was then dried, and the melting point and low shear viscosity were determined. The low shear visocsity determinations were made by the method of R. M. McGlamery and A. A. Harban as described in the technical papers of the Society of Plastics Engineers, Inc., 8, Session 21, paper number 3, as presented at the January 1962, SPE annual technical conference at Pittsburgh, Pa. The results of these runs are expressed as Table I.

dried. The weight of dry polymer was 45.8 grams. A solid cake of polymer was also recovered from the bomb. This cake was ground in a blender with water, filtered and dried. This material weighed 31.7 grams, for a total yield of 77.5 grams of polymer (71.8 percent of theoretical).

A sample of the polymer from the solid cake was melted at 334° C. overnight and quenched. Slow cooling of the melted polymer yielded a brittle material, while the quenched polymer was flexible.

TABLE I

| Run No. | Grams $Na_2S \cdot 9H_2O$ | Grams P-di-chloro-benzene | Solvent used | Vol. solvent, ml. | Reaction temp., °C. | Reaction time, hrs. at reaction temp. | Grams dry polymer recovered | Yield, percent of theoretical | Melting point of polymer,° C. | Low shear vic. at 303° C, poises |
|---|---|---|---|---|---|---|---|---|---|---|
| 30 | 73.4 | 45 | N-methylpyrrolidone | 200 | 260–265 | 41.5 | 26 | 79 | 275 | 8.80 |
| 31 | 73.4 | 45 | do | 200 | 260 | 91 | 20 | 60.5 | 248.5–252 | |
| 32 | 240.2 | 147 | do | 1,000 | 250 | 17 | 96.3 | Not calc. | 275 | |
| 33 | 240.2 | 147 | Dimethylformamide | 1,200 | 250 | 16 | 59.9 | Not calc. | 240 | |
| 34 | 240.2 | 147 | N-methylpyrrolidone | 1,000 | 250 | 17 | 91.0 | 84.2 | 282.5–285.5 | 40.08 |
| 35 | 240.2 | 147 | do | 1,000 | 250 | 17 | 90.7 | 84.0 | 286–291 | 37.30 |
| 36 | 240.2 | 147 | do | 1,000 | 250 | 17 | 91.2 | 84.5 | 284–287 | 37.8 |

A sample of the polymer from Run 32 of Table I was molded at 310° C. and found to be brittle. Another sample was heated under vacuum for 3 hours at 340–360° C., and when molded at 310° C. yielded a brittle disc. A sample was then placed on a hot plate and melted and worked with a spatula while molten. This polymer became tough and was not brittle. Another sample was molded between two hot plates with a fiberglass cloth laminate at 338° C. overnight. This molded sample could be pounded with a hammer without breaking. Still another sample from this run was placed on a hot plate with an air stream blowing over it for about 20 minutes, and was then molded at 310° C. at 12,000 p.s.i. The Shore D hardness of this sample was 85, while the tensile strength at break was 10,143 p.s.i. Another sample was melted on a hot plate on two layers of fiberglass cloth and pressed between two hot plates at 330° C. for 15 hours. This laminate was then remolded in a polymer prises at 310° C. at 12,000 p.s.i. This material had a Shore D hardness at 85, a tensile strength at break of 15,200 p.s.i., and an elongation at break of 1.5 percent. A further sample from run 32 was heated on a hot plate to 371° C. for about 10 minutes in air. After cooling, the polymer was molded at 340° C. at 12,000 p.s.i. then quenched in ice water. The measured low shear viscosity of this material at 303° C. was $1.01 \times 10^4$ poises.

EXAMPLE II

In another run, sodium sulfide and p-dichlorobenzene were reacted in sulfolane. In this run, 200 ml. of sulfolane and 15.5 grams $Na_2S$ were charged to a bomb, and to this mixture was added 29.2 grams of p-dichlorobenzene. The mixture was then heated for 17 hours at 250° C., after which the bomb was opened, and the reaction product removed. The product of this run was a black tar-like product which can be used for the coating of pipes, etc. to provide corrosion resistance, for example.

EXAMPLE III

A run was carried out in which no attempt was made to remove the water of hydration from the sodium sulfide prior to reaction with p-dichlorobenzene. In the run, 1 liter of N-methylpyrrolidone, 147 grams p-dichlorobenzene and 240.2 grams $NaS \cdot 9H_2O$ were sealed in a bomb and heated for 17 hours at 250° C. The product consisted of two phases, a solid polymer and a dark colored liquid. The polymer was removed by filtration, washed 3 times with water, one time with methyl alcohol and then

EXAMPLE IV

In two other runs, separate drying of the sodium sulfide was utilized prior to reaction to show the effect of said drying.

In the first run, one liter of N-methylpyrrolidone and 200 ml. xylene were heated to reflux temperature and to this solution was added 240.2 grams of sodium sulfide nonahydrate. Heating of this mixture at reflux conditions for 1.5 hours caused the removal of considerable amounts of water. The remaining material was charged to a bomb with 147 grams of p-dichlorobenzene. After reaction for 17 hours at 250° C., the bomb was cooled, and the dark colored polymer was removed and worked up as in Example I. This polymer weighed 74.8 grams. This polymer had a melting point of 281.5–286° C., and had a low shear viscosity of 2.68 poises as measured at 303° C.

In the second run, 441.3 grams of $Na_2S \cdot 9H_2O$ which had been under vacuum at room temperature for 1 week was heated to 200° C. under vacuum for 5 hours and kept under nitrogen when removed from vacuum. 282.5 grams of water were removed by this method. 80 grams of this dried sodium sulfide, 1 liter of N-methylpyrrolidone and 151 grams of p-dichlorobenzene were charged to a bomb while flushing with nitrogen. The sealed bomb was then heated to 250° C. for 17 hours, and the resulting polymer was worked up as in Example I. This polymer weighed 73.4 grams, melted 273–277.5° C. and had a low shear viscosity at 303° C. of approximately 2 poises.

EXAMPLE V

To show the effect of an additive according to the present invention, and the effect of the use of oxygen contact with the polymer, a series of runs was carried out in which the procedure of the runs of Table I was employed except that copper or a copper compound was added to the reactor. In each of these runs, the charge comprised 1 liter of N-methylpyrrolidone, 240.2 grams of $Na_2S \cdot 9H_2O$ and 147 grams of p-dichlorobenzene. The sulfate and sulfide were heated to 186° C. for about 1 hour while stirring and flushing with nitrogen to remove water of hydration. The resulting material was then charged to the bomb along with the p-dichlorobenzene and the desired amount of copper or copper compound. Each run was heated to 250° C. for 17 hours, after which the polymer was recovered by filtration, followed by washing as in Example I. The results of these runs are expressed as Table II, Runs 37–40.

TABLE II

| Run No. | Copper source used | Grams copper source used | Grams dry polymer recovered | Melting point of polymer, °C. | Low shear viscosity at 303° C. poises |
|---|---|---|---|---|---|
| 37 | CuCl | 2 | 92.8 | 282.5–286.5 | 18.5 |
| 38 | CuCl | 4 | 92.6 | 285.5–286.5 | 52.4 |
| 39 | Copper tubing | (¹) | 98.8 | 276–280 | 56.3 |
| 40 | CuCl | 8 | 89.6 | 282.5–285.5 | 12.4 |

¹ 129″¼″ 1D copper tubing (coiled).

A sample of each of the polymers from Runs 38 and 39 of Table II was placed on a hot plate in aluminum foil and heated for 5 hours and 55 minutes at 340° C. Low shear viscosity measurements of the heated samples were then carried out. The original polymer from Run 38 had a low shear viscosity at 303° C. of 18.5 poises, and this polymer, after heat treatment, had a low shear viscosity at 303° C. of 139.6 poises. The original polymer from Run 39 had a low shear viscosity at 303° C. of 52.4 poises, while after heat treatment, the low shear viscosity at 303° C. was 3320 poises.

A sample from Run 40 of Table II amounting to 23.5 grams was placed in a glass tube which was then placed in a glass tube which was then placed in an electric furnace. When the polymer had melted, air was passed slowly through the melt. The air was turned on at 310° C., and bubbled through the polymer for 2 hours, at which time the temperature was 355° C. The tube was then cooled, and it was found that the polymer had adhered to the glass. The glass was broken and a sample of the polymer was recovered. The low shear viscosity of this material at 303° C. was 5930 poises.

EXAMPLE VI

A comparison was made between heat treatment of poly(phenylene sulfide) in air and in nitrogen. In these runs, 2 glass tubes were charged with polymer from Run 38 of Table II, and in each tube a gas entry was placed so that nitrogen or air could be bubbled through the polymer. Each tube was placed in a furnace, and nitrogen was bubbled through the other polymer sample while heating the polymer above its melting point. After 2 hours at 340° C., the samples were removed from the furnace and cooled. Neither sample lost any weight in this treatment. The original polymer before treatment had a low shear viscosity at 303° C. of 52.4 poises. The sample heated in nitrogen had a low shear viscosity at 303° C. of 84.2 poises, while the low shear viscosity at 303° C. of the sample treated with air was 2860 poises. Each sample was molded to a film at 340° C. The nitrogen-treated sample was brittle, while the air-treated sample was flexible, and much stronger than the nitrogen-treated sample.

EXAMPLE VII

Two runs were carried out in which an amount of mono-chlorobenzene was charged along with the p-dichlorobenzene to modify the polymer and cause a reduction in molecular weight.

In the first run, 200 ml. of N-methylpyrrolidone and 75 grams of $Na_2S \cdot 9H_2O$ were charged to a glass flask and heated to 190° C. while flushing with nitrogen to remove water of hydration. This material was charged to a stainless steel bomb along with 23 grams of p-dichlorobenzene and 35.2 grams of chlorobenzene. This mixture was then heated for 17 hours at 250° C., after which the bomb was opened and the product recovered. The material recovered comprised a dark liquid and a solid. The solid material, sodium chloride, was filtered out. The liquid was then extracted with chloroform and with benzene.

In the second run, the charge was the same as in the first run above except that 2 grams of CuCl were added. Again, a liquid product was obtained which was soluble in acetone. Some white crystalline material separated out when this material was cooled.

EXAMPLE VIII

A run was carried out in which a small amount of o-chloroaniline was employed to modify the characteristics of the polymer. In this run, 73.2 grams of $Na_2S \cdot 9H_2O$ was heated to 190° C. in 400 ml. N-methylpyrrolidone to remove water. This material was then charged to a bomb along with 41 grams of p-dichlorobenzene and 6.4 grams of 2-chloroaniline. The sealed bomb was then heated to 250° C. for 17 hours, after which the polymer was recovered and worked up as in Example I. 24.4 grams of polymer, melting 283–286° C. was recovered. The low shear viscosity at 303° C. of this material was 52 poises.

EXAMPLE IX

Two runs were carried out in which dichlorotoluene was employed to modify the characteristics of poly(phenylene sulfide). In the first run, 240 grams of $Na_2S \cdot 9H_2O$ was heated to 190° C. in one liter of N-methylpyrrolidone to remove water. This material was charged to the bomb along with 73.5 grams of p-dichlorobenzene and 80.5 grams of 2,4-dichlorotoluene. The sealed bomb was heated for 17 hours at 250° C., after which the reactor was cooled. In this run, the polymer appeared to all be in solution. The filtrate, after filtering out the sodium chloride, was poured into 2 liters of water, resulting in the formation of an emulsion. 200 ml. of acetic acid was then added to coagulate the polymer, after which the recovered polymer was heated on a steam vent for 2 hours. The resulting polymer was viscous, but did pour at the boiling point of water. After drying at 125° C. under vacuum overnight, 100.3 grams (89.5 percent of theoretical) of polymer was obtained. This polymer melted below 100° C. to a viscous liquid. At room temperature, the material was a hard brittle solid.

In the second run, 240.2 grams of $Na_2S \cdot 9H_2O$ was heated to 190° C. in 1 liter N-methylpyrrolidone to remove water. The resulting material was charged to a bomb with 103 grams of p-dichlorobenzene, 40.3 grams of 2,4-dichlorotoluene and 6 grams of 1,2,4-trichlorobenzene (crosslinking agent). After heating for 17 hours at 250° C., the bomb was opened, and the polymer was removed and worked up as in Example I. Some additional polymer was in solution, and this material was recovered by pouring the filtrate into 2 liters of water and adding 200 ml. acetic acid to precipitate polymer. After drying, the insoluble polymer was found to weigh 47.9 grams while the polymer recovered from solution amounted to 49.1 grams. The insoluble polymer melted at 215° C.

EXAMPLE X

A series of runs was carried out in which various amounts of 1,2,4-trichlorobenzene was added along with the p-dichlorobenzene to crosslink the polymer.

In each run 240.2 grams of $Na_2S \cdot 9H_2O$ was heated to 190° C. in 1 liter of N-methylpyrrolidone while flushing with nitrogen to remove water of hydration.

In the first run, the dehydrated sulfide mixture was charged to the bomb along with 132.1 grams p-dichlorobenzene and 12 grams of 1,2,4-trichlorobenzene. The mixture was heated for 17 hours at 250° C., followed by cooling and recovery in the manner of Example I. The recovered dry polymer amounted to 84.6 grams and meteld at 250° C. A sample of molded film was heated at 340° C. in air for 4 hours and quenched in ice water. This sample was tough and very hard to break.

In the second run, the dehydrated sulfide mixture was charged to the bomb along with 117.8 grams of p-dichlorobenzene and 24 grams of 1,2,4-trichlorobenzene. After 17 hours at 250° C., the polymer was recovered and washed as in Example I, yielding 85.1 grams of dry polymer, melting at 370° C.

In the third run, the dehydrated sulfide mixture was charged to the bomb along with 139.8 grams p-dichlorobenzene and 6 grams of 1,2,4-trichlorobenzene. After 17 hours at 250° C., 81.4 grams of dry polymer were obtained, melting at 265° C.

A sample of this polymer from the third run was melted in an aluminum dish at 316° C. This material was quenched in water yielding a brittle material. This brittle sample was placed on a hot plate at 316° C. and heated overnight in air. A very tough sample was obtained which could not be broken with a hammer. A sample of this material was remolded between aluminum foil at 295° C. and 18,000 p.s.i. A flexible tough film was obtained.

The use of trihalobenzene as illustrated in this example causes crosslinking, and increasing the amount of trihalobenzene leads to polymers of increased strength.

EXAMPLE XI

To illustrate the changes in molecular weight due to the use of varying amounts of sodium sulfide, there were conducted additional runs like those of Example I, in which the amount of sodium sulfide was varied slightly. After dehydration, the reaction was effected at 250° C. for 17 hours. The following table shows the drop in the low shear viscosity at 303° C. (poises) with the use of larger amounts of sodium sulfide.

TABLE III

| Mol ratio $Na_2S$/p-dichlorobenzene: | Low shear viscosity at 303° C., poises |
|---|---|
| 1.00 | 37.3 |
| 1.02 | 6.4 |
| 1.04 | 4.8 |
| 1.05 | 7.1 |

EXAMPLE XII 1 liter of N-methylpyrrolidone (NMP) and 720.6 grams of $Na_2S \cdot 9H_2O$ were charged to a glass flask and heated while stirring to distill water of hydration. This distillation removed 517.6 grams overhead (including some NMP). The remaining material was charged to a steel reactor along with 441 grams of p-dichlorobenzene. This mixture was heated for 17 hours at 440° F. (226.7° C.), after which the reactor was opened, and the solid polymer was removed. This polymer was washed three times, using two liters of methanol, followed by two liters of water in each wash. This polymer, when dried, weighed 285 grams. This polymer was heat treated by heating under vacuum at 620° F. for 24 hours, after which it was molded at 575° F. at 10,000 p.s.i. and allowed to cool to room temperature. The properties of this polymer were:

Flexural modulus—48,000 p.s.i.
Hardness, Shore D—85
Tensile strength at yield—12,375 p.s.i.
Elongation at break—12%

EXAMPLE XIII

In another preparation, one liter of NMP and 720 grams of $Na_2S \cdot 9H_2O$ were heated under nitrogen to drive water off overhead. After removing 550 grams of overhead, the resultant mixture was charged to a steel reactor with 485 grams p-dichlorobenzene and heated for 17 hours at 450–460° F. The reaction temperature was then raised to 500–560° F. for 2.5 hours. Washing by the same method described above in Example XII, followed by drying, yielded 298 grams of dry polymer. This polymer was heat treated at 640° F. for 24 hours under vacuum. Only 3.1 grams out of 94.9 grams were lost during heat treatment. This is an amazingly low loss when it is considered that the polymer was heated under vacuum at 640° F. for 24 hours. The electrical properties given in this example were determined by the method of ASTM D–1531–61. This heat treated polymer was then molded at 590° F. and 20,000 p.s.i., after which the electrical properties of the polymer were determined.

ELECTRICAL PROPERTIES

Dielectric constant:
100 kc. ---------------------------- 2.3337
1 mc. ---------------------------- 2.3335
Dissipation factor:
100 kc. ---------------------------- 0.000379
1 mc. ---------------------------- 0.000454

EXAMPLE XIV

A run was carried out in which p-dichlorobenzene and sodium sulfide were reacted according to the process of this invention, using hexamethylphosphoramide (HMP) as the reaction solvent.

In this run, 120 grams (0.500 mol) of sodium sulfide nonahydrate, 500 ml. of HMP and 200 ml. of toluene were charged to a 1-liter, 3-necked flask under nitrogen. The resulting mixture was heated to drive off water by distillation and this was continued while stirring unitl the vapor temperature reached 238° C. The liquid was then cooled to about 130° C. and 73.5 grams (0.50 mol) of p-dichlorobenzene was added. The mixture was then refluxed at 226 to 239° C. liquid temperature for 24 hours, after which it was allowed to stand over a weekend. The mixture was then diluted with water, filtered, washed twice with water, washed three times with nitrogen and dried at 70° C. under vacuum. The weight of dry polymer was 44.3 grams which is equivalent to 82 percent conversion. The melting point of this polymer was 260 to 265° C.

EXAMPLE XV

A run was carried out in which p-dichlorobenzene was reacted with sodium sulfide, using tetramethylurea (TMU) as the solvent.

In this run, 27.75 grams (0.345 mol) of anhydrous $Na_2S$, 50.7 grams (0.345 mol) of p-dichlorobenzene and 400 ml. tetramethylurea were charged to a one-liter stainless steel stirred autoclave and heated to 250° C. for 21 hours. The reaction mixture was then poured into water and the brown solid polymer present was recovered and dried under vacuum. After drying, the weight of polymer was 28.5 grams, representing a yield of 76.5 percent of theoretical. This polymer softened at 280 to 285° C.

EXAMPLE XVI

A run was carried out in which it was attempted to react p-dichlorobenzene with sodium sulfide, using 1-methylnaphthalene as the reaction solvent. In this run, 33.7 grams of anhydrous $Na_2S$, 61 grams of p-dichlorobenzene and 580 ml. of 1-methylnaphthalene were heated together at 300° C. for 28 hours. No reaction occurred. This run demonstrates that a polar organic solvent is required in the process of this invention.

EXAMPLE XVII

A run was carried out in which a polymer was prepared according to the process of this invention by reaction of sodium sulfide and m-dichlorobenzene in NMP.

In this run, 480.4 grams of sodium sulfide nonahydrate and 1 liter of NMP were charged to a 3-liter flask and heated until 385 grams of water was distilled overhead. The remaining material was poured into a stainless steel bomb and 294 grams of m-dichlorobenzene was added to the bomb. The bomb was then sealed and placed in a rocker and heated to 440° F. for 17 hours while rocking.

The reaction mixture was then washed four times with water, filtered after each wash, and the recovered polymer was dried under vacuum overnight. The yield of dry polymer was 217 grams.

EXAMPLE XVIII

In another run, a polymer was prepared by the reaction of 4,4'-dibromobiphenyl with sodium sulfide in NMP. In this run, 1 liter of NMP and 240.2 grams of sodium sulfide nonahydrate was charged to a 3-liter flask and heated until 385 grams of water was distilled overhead. This mixture was then charged to a bomb and the solution was allowed to cool, after which 312 grams of 4,4'-dibromobiphenyl was added. The bomb was then sealed and placed in a rocker and rocked for 3 hours at 300° C. After washing the polymer three times with water, the polymer was dired in a vacuum oven overnight at 125° C. 184 grams of dry polymer was recovered. The melting point was 431° C. and the freezing peak was 395° C. as determined by differential thermal analysis.

EXAMPLE XIX

In still another run, the polymer was prepared by the reaction of 2,5-dibromothiophene with sodium sulfide. This run was carried out by the method in Example XVIII, using one liter of NMP and 240.2 grams of sodium sulfide nonahydrate. The amount of water distilled overhead during drying was 186 grams. The charge of 2,5-dibromothiophene added was 240 grams, while the reaction was carried out for 17 hours at 440° F. After recovering the polymer by the method of Example XVIII, 56 grams of dry polymer was obtained.

EXAMPLE XX

A run was carried out in which a polymer was prepared by the reaction of 4,4'-bis-p-bromophenyl ether with sodium sulfide in NMP. In this run, 73.2 grams of sodium sulfide nonahydrate and 400 ml of NMP was heated to 190° C. while flushing with nitrogen to remove water. The resultant solution was charged to a bomb along with 100 grams of bis-p-bromophenyl ether and heated 17 hours at 250° C. After washing, filtering, and drying by the method of Example XVIII, 47.1 grams of solid polymer was obtained. The melting point of this polymer was 195 to 200.5° C.

EXAMPLE XXI

In still another run, a polymer was prepared by the reaction of 2,5-dichlorobenzenesulfonic acid with sodium sulfide in NMP according to the process of this invention. In this run, 93 grams of sodium sulfide nonahydrate in 500 ml NMP was heated to about 190° C. while flushing with nitrogen to remove approximately 70 ml. of water as overhead. The remaining material was mixed with 101.9 grams of 2,5-dichlorobenzenesulfonic acid and heated together for 4 hours at 200° C. A water soluble polymer was obtained.

EXAMPLE XXII

A run was also carried out in which a polymer was prepared by the reaction of 2,4-dichlorotoluene with sodium sulfide in NMP. In this run one liter of NMP and one mol of sodium sulfide nonahydrate was charged to a glass flask and heated while stirring until 200 ml. of water and NMP were removed as overhead. The remaining material was charged to a bomb and to this mixture was added one mol of 2,4-dichlorotoluene. The resulting mixture was heated for 15 hours at 450° F. and 2 hours at 500° F., after which the reactor was cooled and opened. The polymeric product was soluble in NMP. The solution was poured into 2 liters of water causing the polymer to precipitate. The precipitated polymer was heated on a steam bath and 2 liters of chloroform was added to extract the polymer. The polymer solution was then poured into methyl alcohol to precipitate the polymer, after which the polymer was dried overnight under vacuum at 125° C. The polymer was a clear resin at room temperature and melted below 100° C. to a viscous fluid. The weight of the polymer was 84 grams, and was soluble in benzene. A sample of this polymer was heated 3 hours under vacuum at 620° F., resulting in a hard crosslinked material that could not be molded at 590° F. and 22,000 p.s.i. due to the fact that the polymer would not melt at these conditions. This polymer which had been heat treated was insoluble in hot benzene.

EXAMPLE XXIII

A series of runs was carried out in which p-dichlorobenzene was reacted with sodium sulfide in NMP with various times and reaction temperatures. In each of these runs one mol of sodium sulfide nonahydrate and one liter of NMP were heated at 190° C. while bubbling nitrogen through the material to remove the water of hydration. After essentially all the water had been removed, one mol of p-dichlorobenzene was added to the mixture and the mixture was heated to a temperature above 200° C. After the indicated reaction period, the polymer was recovered, washed twice with water and once with methanol and dried overnight under vacuum. The results of these runs are shown below in the form of a table.

TABLE IV

| Time, hours | Temperature, ° C. | Wt. dry polymer | Low shear viscosity at 303° C., poises |
|---|---|---|---|
| 42 | 250 | 92.5 | 35.1 |
| 7.5 | 250 | 86.2 | 29.1 |
| 7.5 | 300 | 92.4 | 6.50 |
| 1 | 250 | 90.4 | 28.9 |
| 2 | 300 | | |
| 1 | 300 | 88.3 | 10.60 |
| 0.25 | 300 | 89.5 | 13.33 |
| | (¹) | 88.3 | 8.76 |

¹ Heated to 300° C., then cooled.

EXAMPLE XXIV

A run was carried out in which large quantities of p-dichlorobenzene and large quantities of sodium sulfide were contacted in one liter of NMP. In this run, 3 mols of sodium sulfide nonahydrate was added to one liter of NMP and heated to 190° C. while flushing with nitrogen to remove water of hydration. 517.6 grams of material was removed as overhead from this drying step. The resulting mixture was charged to a steel reactor along with 3 mols of p-dichlorobenzene. The resulting mixture was heated for 17 hours at 440° F. (227° C.), after which the polymer was recovered and washed six times, alternating between 2 liters of methanol and 2 liters of water using methanol first. The polymer was then dried under vacuum overnight, yielding 285 grams of dry polymer. This polymer had a melting point of 276° C. and a low shear viscosity of 639 poisse as determined at 303° C.

EXAMPLE XXV

Two runs were carried out in which fillers were added to the polymerization zone. In one run, a mixture of one liter of NMP and 720.6 grams of sodium sulfide nonhydrate was distilled until 520 grams of material was removed overhead. This mixture was then charged to a bomb along with 441 grams of p-dichlorobenzene and 100 grams of graphite powder. This mixture was then rocked on a rocker for 17 hours at 440° F., after which the polymer was removed and washed five times with 2 liters of water and one time with 2 liters of methanol. The dried polymer contained a homogenous dispersion of graphite.

This run was repeated except that the amount of overhead was 480 grams from the drying step, and 485 grams of p-dichlorobenzene and 30 grams of molybdenum disulfide instead of the graphite was added to the reaction zone. 344 grams of polymer containing dispersed molybdenum disulfide was recovered.

Reasonable variation and modification are possible within the scope of the foregoing disclosure and the appended claims to this invention.

We claim:
1. Process of increasing the molecular weight of a poly(arylene sulfide) comprising subjecting said poly-(arylene sulfide) to a heat treatment under an oxidizing atmosphere at an elevated temperature above the melting point of said polymer and for a finite period of time sufficient to appreciably increase the molecular weight of the poly(arylene sulfide).

2. Process of claim 1 wherein said poly(arylene sulfide) is produced by reacting at least one polyhalo-substituted aromatic compound wherein the halogen atoms are attached to ring carbon atoms with an alkali metal sulfide in a polar organic compound at an elevated temperature for a time sufficient to obtain said polymer, said polar organic compound being a material that will substantially dissolve both the alkali metal sulfide and the polyhalo-substituted aromatic compound.

3. Process of claim 1 wherein poly(arylene sulfide) is produced by reacting at least one compound selected from the group consisting of:

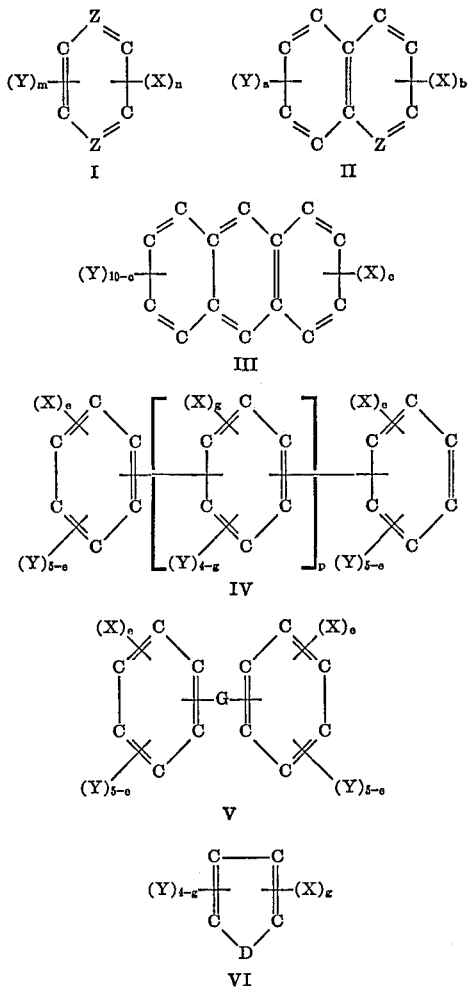

wherein each X is a halogen selected from the group consisting of chlorine, bromine, iodine, and fluorine, preferably chlorine and bromine, each Y is selected from the group consisting of hydrogen, —R, —N(R)$_2$,

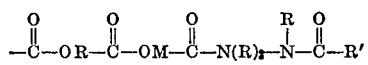

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of:

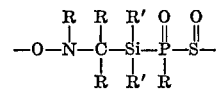

and

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1 with an alkali metal sulfide in a polar organic compound at an elevated temperature for a time sufficient to obtain said polymer, said polar organic compound being a compound that will substantially dissolve both the alkali metal sulfide and the polyhalo-substituted compound having a formula as defined.

4. Process of claim 1 wherein said heat treatment is effected in an oxygen-containing gaseous oxidizing atmosphere.

5. Process of claim 1 wherein said heat treatment is effected under an atmosphere of air.

6. Process of claim 1 wherein said heat treatment is effected at subatmospheric pressure.

7. Process of claim 1 wherein said heat treatment is effected at a temperature from about 250° C. to about 600° C.

8. Process of claim 1 wherein said heat treatment is effected during a finite period of time up to about 24 hours.

9. Process of claim 2 wherein said poly-halo substituted aromatic compound is p-dichlorobenzene.

10. A process according to claim 3 for the formation of a high melting point poly(phenylene sulfide) which comprises polymerizing (a) p-dichlorobenzene with (b) sodium sulfide in a mol ratio of (a) to (b) in the range 0.9:1 to 2:1 in (c) a polar organic solvent selected from N-methylpyrrolidone, dimethylformamide, sulfolane, hexamethylphosphoramide and tetramethylurea at an elevated temperature ranging from 125–450° C., recovering the polymers thus produced from the reaction mass and subjecting same to a heat treatment in the presence of air at an elevated temperature above the melting point of the polymer for a finite period of time sufficient to modify the characteristics of said polymer so as to leave a flexible, strong polymer after said heat treatment.

11. A process according to claim 10 wherein said polymer thus produced is recovered from the reaction mass and subjected to heat treatment under subatmospheric pressure at an elevated temperature above the melting point of the polymer for a finite period of time sufficient to modify the characteristics of said polymer so as to leave a flexible, strong polymer after said heat treatment.

References Cited

UNITED STATES PATENTS

| | | | |
|---|---|---|---|
| 2,986,582 | 5/1961 | Martin et al. | 260—79.1 |
| 3,268,504 | 8/1966 | Harris et al. | 260—79.1 |
| 3,274,165 | 9/1966 | Lenz et al. | 260—79 |
| 3,303,170 | 2/1967 | Pike | 260—79.1 |
| 3,317,487 | 5/1967 | Smith | 260—79 |
| 3,324,087 | 6/1967 | Smith et al. | 260—79 |
| 3,326,865 | 6/1967 | Smith | 260—79 |
| 3,354,129 | 11/1967 | Edmonds et al. | 260—79.1 |

DONALD E. CZAJA, Primary Examiner

M. I. MARQUIS, Assistant Examiner

U.S. Cl. X.R.

117—124, 143; 161—93; 260—37, 79

UNITED STATES PATENT OFFICE

CERTIFICATE OF CORRECTION

Patent No. 3,524,835     James T. Edmonds, Jr.     Dated: August 18, 1970
Harold Wayne Hill, Jr.

It is certified that error appears in the above-identified patent and that said Letters Patent are hereby corrected as shown below:

Column 15, line 70,    " $-\overset{O}{\underset{}{C}}-OR-\overset{O}{\underset{}{C}}-OM-\overset{O}{\underset{}{C}}-N(R)_2-\overset{R}{\underset{}{N}}-\overset{O}{\underset{}{C}}-R'$ "

should read    — $-\overset{O}{\underset{}{C}}-OR,\ -\overset{O}{\underset{}{C}}-OM,\ -\overset{O}{\underset{}{C}}-N(R)_2,\ -\overset{R}{\underset{}{N}}-\overset{O}{\underset{}{C}}-R'$ —

Column 16, line 4, "frdm" should read — from —;

line 15,    " $-O-\overset{R}{\underset{R}{N}}-\overset{R}{\underset{R'}{C}}-\overset{R'}{\underset{R}{Si}}-\overset{O}{\underset{}{P}}-\overset{O}{\underset{}{S}}-$ "

should read    — $-O-,\ -\overset{R}{\underset{R}{N}}-,\ -\overset{R}{\underset{R}{C}}-,\ -\overset{R'}{\underset{R'}{Si}}-,\ -\overset{O}{\underset{R}{P}}-,\ -\overset{O}{\underset{}{S}}-$ —.

SIGNED AND SEALED
DEC 1 1970

(SEAL)
Attest:

Edward M. Fletcher, Jr.
Attesting Officer

WILLIAM E. SCHUYLER, JR.
Commissioner of Patents